United States Patent
Feng et al.

(10) Patent No.: US 11,863,881 B2
(45) Date of Patent: Jan. 2, 2024

(54) SELECTIVELY INCREASING DEPTH-OF-FIELD IN SCENES WITH MULTIPLE REGIONS OF INTEREST

(71) Applicant: QUALCOMM Incorporated, San Diego, CA (US)

(72) Inventors: Wen-Chun Feng, New Taipei (TW); Yu-Ren Lai, Nantou County (TW); Hsin Yueh Chang, Zhubei (TW)

(73) Assignee: QUALCOMM Incorporated, San Diego, CA (US)

(*) Notice: Subject to any disclaimer, the term of this patent is extended or adjusted under 35 U.S.C. 154(b) by 121 days.

(21) Appl. No.: 17/645,688

(22) Filed: Dec. 22, 2021

(65) Prior Publication Data

US 2023/0012219 A1    Jan. 12, 2023

Related U.S. Application Data

(60) Provisional application No. 63/218,804, filed on Jul. 6, 2021.

(51) Int. Cl.
*H04N 23/959* (2023.01)
*H04N 23/68* (2023.01)
(Continued)

(52) U.S. Cl.
CPC .......... *H04N 23/959* (2023.01); *G06T 5/003* (2013.01); *G06T 5/008* (2013.01); *G06T 7/20* (2013.01);
(Continued)

(58) Field of Classification Search
CPC .... H04N 23/959; H04N 23/682; H04N 23/80; H04N 23/61; H04N 23/683;
(Continued)

(56) References Cited

U.S. PATENT DOCUMENTS

| 2008/0317378 | A1 | 12/2008 | Steinberg et al. |
| 2010/0220208 | A1* | 9/2010 | Park ........................ G06T 5/002 |
| | | | 348/222.1 |

(Continued)

OTHER PUBLICATIONS

International Search Report and Written Opinion—PCT/US2022/073395—ISA/EPO—dated Nov. 15, 2022 (2106320WO).

*Primary Examiner* — Hung H Lam
(74) *Attorney, Agent, or Firm* — QUALCOMM Incorporated

(57) ABSTRACT

The present disclosure provides systems, apparatus, methods, and computer-readable media that support multi-frame depth-of-field (MF-DOF) for deblurring background regions of interest (ROIs), such as background faces, that may be blurred due to a large aperture size or other characteristics of the camera used to capture the image frame. The processing may include the use of two image frames obtained at two different focus points corresponding to the multiple ROIs in the image frame. The corrected image frame may be determined by deblurring one or more ROIs of the first image frame using an AI-based model and/or local gradient information. The MF-DOF may allow selectively increasing a depth-of-field (DOF) of an image to provide focused capture of multiple regions of interest, without causing a reduction in aperture (and subsequently an amount of light available for photography) or background blur that may be desired for photography.

34 Claims, 5 Drawing Sheets

(51) Int. Cl.
  *G06V 10/25* (2022.01)
  *G06V 10/24* (2022.01)
  *G06V 40/16* (2022.01)
  *G06T 5/00* (2006.01)
  *G06T 7/20* (2017.01)
  *G06T 7/70* (2017.01)
  *G06V 10/75* (2022.01)
  *H04N 23/80* (2023.01)

(52) U.S. Cl.
  CPC ............... *G06T 7/70* (2017.01); *G06V 10/24* (2022.01); *G06V 10/25* (2022.01); *G06V 10/75* (2022.01); *G06V 40/161* (2022.01); *H04N 23/682* (2023.01); *H04N 23/80* (2023.01); *G06T 2207/20221* (2013.01); *G06T 2207/30201* (2013.01)

(58) Field of Classification Search
  CPC ....... H04N 23/951; G06T 5/003; G06T 5/008; G06T 7/20; G06T 7/70; G06T 2207/20221; G06T 2207/30201; G06T 2207/10024; G06T 2207/10048; G06T 2207/20208; G06T 5/50; G06T 2207/10016; G06T 2207/20076; G06T 2207/20081; G06V 10/24; G06V 10/25; G06V 10/75; G06V 40/161
  See application file for complete search history.

(56) References Cited

U.S. PATENT DOCUMENTS

| | | | |
|---|---|---|---|
| 2015/0271416 A1* | 9/2015 | Song | H04N 23/90 348/218.1 |
| 2015/0334373 A1* | 11/2015 | Kubota | H04N 13/271 348/49 |
| 2017/0024920 A1 | 1/2017 | Zhang et al. | |
| 2022/0108424 A1* | 4/2022 | Gan | G06T 3/4046 |
| 2022/0108427 A1 | 4/2022 | Kim et al. | |

* cited by examiner

SELECTIVELY INCREASING DEPTH-OF-FIELD IN SCENES WITH MULTIPLE REGIONS OF INTEREST

CROSS-REFERENCE TO RELATED APPLICATIONS

This application claims the benefit of U.S. Provisional Patent Application No. 63/218,804, entitled, "SELECTIVELY INCREASING DEPTH-OF-FIELD IN SCENES WITH MULTIPLE REGIONS OF INTEREST," filed on Jul. 6, 2021, which is expressly incorporated by reference herein in its entirety.

TECHNICAL FIELD

Aspects of the present disclosure relate generally to image signal processing. Some features may enable and provide improved communications, including deblurring operations that may compensate for image characteristics such as blur introduced by large aperture sizes.

INTRODUCTION

Image capture devices are devices that can capture one or more digital images, whether still image for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

Image processing techniques can be used to improve the quality of photographs and videos captured by image capture devices. For example, algorithms can alter the appearance of colors in a photograph, increase the dynamic range or range of colors in a photograph, increase detail in a photograph, reduce noise in a photography, reduce blur in a photography, among many other processing techniques that may improve the image quality as viewed by a user.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Embodiments of an image processing technique described herein may improve the appearance of a first image frame based on characteristics of a second image frame without combining (e.g., merging, fusing, or blending) data of the second image frame with the first image frame. This processing removes the possibility of adding artifacts to the first image frame resulting from the merging of data. For example, discontinuities and shifts in objects between the image frames may result in ghosting or broken lines when a first image frame is merged with a second image frame. An operation on the first image frame may be performed based on analysis of the second image frame, including analysis comparing corresponding regions of interest between the first and second image frames.

The image processing techniques according to embodiments herein may be beneficial in increasing an apparent depth of focus of an image. Limitations inherent in image capture devices result in portions of an image frame being blurrier than others due to the limited capability of the camera to focus. For example, an image may have a face close to the camera in the foreground in focus while a face far from the camera in the background is out of focus. A user may desire for both faces to be in-focus in a photograph. The image processing techniques described herein may perform multi-frame field-of-depth (MF-DOF) processing to improve the appearance of the photography by reducing blur on the out-of-focus face using a second image frame captured at a different focal distance from a first image frame.

In one aspect of the disclosure, a method for image processing includes receiving a first image frame representing a scene captured at a first focal distance; receiving a second image frame representing the scene captured at a second focal distance different from the first focal distance; determining a corresponding set of regions of interest comprising a first region of interest in the first image frame and a second region of interest in the second image frame; determining a value based on a comparison of the first region of interest with the second region of interest; and determining a corrected first image frame based on the first image frame and the value.

In an additional aspect of the disclosure, an apparatus includes at least one processor and a memory coupled to the at least one processor. The at least one processor is configured to perform operations including: receiving a second image frame representing the scene captured at a second focal distance different from the first focal distance; determining a corresponding set of regions of interest comprising a first region of interest in the first image frame and a second region of interest in the second image frame; determining a value based on a comparison of the first region of interest with the second region of interest; and determining a corrected first image frame based on the first image frame and the value.

In an additional aspect of the disclosure, an apparatus includes means for receiving a first image frame representing a scene captured at a first focal distance; means for receiving a second image frame representing the scene captured at a second focal distance different from the first focal distance; means for determining a corresponding set of regions of interest comprising a first region of interest in the first image frame and a second region of interest in the second image frame; means for determining a value based on a comparison of the first region of interest with the second region of interest; and means for determining a corrected first image frame based on the first image frame and the value.

In an additional aspect of the disclosure, a non-transitory computer-readable medium stores instructions that, when executed by a processor, cause the processor to perform operations. The operations include receiving a first image frame representing a scene captured at a first focal distance; receiving a second image frame representing the scene captured at a second focal distance different from the first focal distance; determining a corresponding set of regions of interest comprising a first region of interest in the first image frame and a second region of interest in the second image frame; determining a value based on a comparison of the first region of interest with the second region of interest; and determining a corrected first image frame based on the first image frame and the value.

Image capture devices, devices that can capture one or more digital images whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

In general, this disclosure describes image processing techniques involving digital cameras having image sensors and image signal processors (ISPs). The ISP may be configured to control the capture of image frames from one or more image sensors and process one or more image frames from the one or more image sensors to generate a view of a scene in a corrected image frame. A corrected image frame may be part of a sequence of image frames forming a video sequence. The video sequence may include other image frames received from the image sensor or other images sensors and/or other corrected image frames based on input from the image sensor or another image sensor. In some embodiments, the processing of one or more image frames may be performed within the image sensor, such as in a binning module. The image processing techniques described in embodiments disclosed herein may be performed by circuitry, such as a binning module, in the image sensor, in the image signal processor (ISP), in the application processor (AP), or a combination or two or all of these components.

In an example, the image signal processor may receive an instruction to capture a sequence of image frames in response to the loading of software, such as a camera application, to produce a preview display from the image capture device. The image signal processor may be configured to produce a single flow of output frames, based on images frames received from one or more image sensors. The single flow of output frames may include raw image data from an image sensor, binned image data from an image sensor, or corrected image frames processed by one or more algorithms, such as in a binning module, within the image signal processor. For example, an image frame obtained from an image sensor, which may have performed some processing on the data before output to the image signal processor may be processed in the image signal processor by processing the image frame through an image post-processing engine (IPE) and/or other image processing circuitry for performing one or more of tone mapping, portrait lighting, contrast enhancement, gamma correction, etc.

After an output frame representing the scene is determined by the image signal processor using the image correction, such as binning described in various embodiments herein, the output frame may be displayed on a device display as a single still image and/or as part of a video sequence, saved to a storage device as a picture or a video sequence, transmitted over a network, and/or printed to an output medium. For example, the image signal processor may be configured to obtain input frames of image data (e.g., pixel values) from the different image sensors, and in turn, produce corresponding output frames of image data (e.g., preview display frames, still-image captures, frames for video, frames for object tracking, etc.). In other examples, the image signal processor may output frames of the image data to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. That is, the image signal processor may obtain incoming frames from one or more image sensors, each coupled to one or more camera lenses, and, in turn, may produce and output a flow of output frames to various output destinations.

In some aspects, the corrected image frame may be produced by combining aspects of the image correction of this disclosure with other computational photography techniques such as high dynamic range (HDR) photography or multi-frame noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The apparatus may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur with a lens cluster on a mobile device, such as where multiple image sensors and associated lenses are located in offset locations on a frontside or a backside of the mobile device. Additional image sensors may be included with larger, smaller, or same field of views. The image correction techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in as a recording or as streaming data, over a first network connection of a plurality of network connections; and a processor coupled to the first network adaptor, and the memory. The processor may cause the transmission of corrected image frames described herein over a wireless communications network such as a 5G NR communication network.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
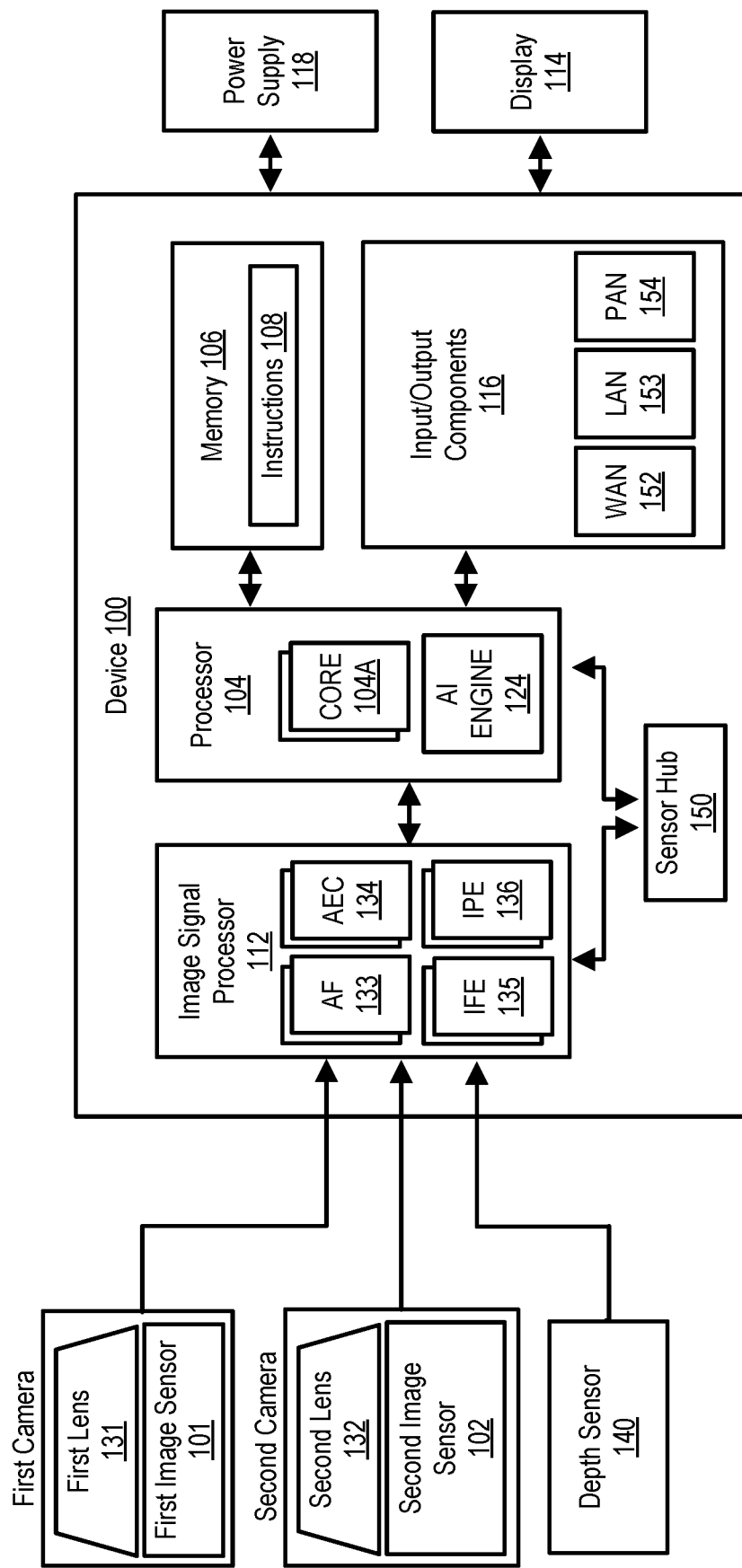
FIG. 1 shows a block diagram of an example device for performing image capture from one or more image sensors.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support multi-frame depth-of-field (MF-DOF) for deblurring background regions of interest (ROIs), such as background faces, that may be blurred due to a large aperture size or other characteristics of the camera used to capture the image frame. The processing may include the use of two image frames obtained at two different focus points corresponding to the multiple ROIs in the image frame. The corrected image frame may be determined by deblurring one or more ROIs of the first image frame using an AI-based model and/or local gradient information, such as using a CV-based deblurring method with local gradient information. The MF-DOF may allow selectively increasing a depth-of-field (DOF) of an image to provide focused capture of multiple regions of interest, without causing a reduction in aperture (and subsequently an amount of light available for photography) or background blur that may be desired for photography.

Particular implementations of the subject matter described in this disclosure may be implemented to realize one or more of the following potential advantages or benefits. In some aspects, the present disclosure provides techniques for image signal processing that decreases computation complexity, such as involved in fusing multiple image frames, and reduces the artifacts (e.g., halo effect, ghosting effect) that may be generated, such as when fusing multiple image frames. An enhanced image frame may still be obtained through image processing techniques according to embodiments of the disclosure herein by deblurring the background ROIs using multi-frame processing.

An example device for capturing image frames using one or more image sensors, such as a smartphone, may include a configuration of two, three, four, or more cameras on a backside (e.g., a side opposite a user display) or a front side (e.g., a same side as a user display) of the device. Devices with multiple image sensors include one or more image signal processors (ISPs), Computer Vision Processors (CVPs) (e.g., AI engines), or other suitable circuitry for processing images captured by the image sensors. The one or more image signal processors may provide processed image frames to a memory and/or a processor (such as an application processor, an image front end (IFE), an image post-processing engine (IPE), or other suitable processing circuitry) for further processing, such as for encoding, storage, transmission, or other manipulation.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any suitable electronic device including or coupled to two or more image sensors capable of capturing image frames (or "frames"). Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and input/output (I/O) components 116. I/O components 116 may be used for interacting with a user, such as a touch screen interface and/or physical button interface. I/O components 116 may also include network interfaces for communicating with other devices, including a wide area network (WAN) adaptor 152, a local area network (LAN) adaptor 153, and/or a personal area network (PAN) adaptor 154. Examples of WAN adaptor 152 include a 4G LTE or a 5G NR wireless network adaptor. An example LAN adaptor 153 is an IEEE 802.11 WiFi wireless network adapter. An example PAN adaptor 154 is a Bluetooth wireless network adaptor. Each of the adaptors 152, 153, and/or 154 may be coupled to an antenna and may be coupled to multiple antennas configured for primary and diversity reception and/or configured for receiving specific frequency bands. The device 100 may further include or be coupled to a power supply 118 for the device 100, such as a battery or a component to couple the device 100 to an energy source. The device 100 may also include or be coupled to additional features or components that are not shown in FIG. 1. In one example, one or more transceivers and a baseband processor may be coupled to or included in WAN adaptor 152 for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver. The data from sensor hub 150 may be used by the image signal processor 112 for generating corrected image frames, such as by applying electronic image stabilization (EIS) and/or digital image stabilization (DIS).

The image signal processor 112 may receive image data from one or more cameras in the form of image frames. In one embodiment, a local bus connection couples the image signal processor 112 to image sensors 101 and 102 of a first and second camera, respectively. In another embodiment, a wire interface couples the image signal processor 112 to an external image sensor. In a further embodiment, a wireless interface couples the image signal processor 112 to the image sensor 101, 102.

A first camera may include the first image sensor 101 and a corresponding first lens 131.

A second camera may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane corresponding to a certain focus position. The AF algorithm 133 may be assisted by depth sensor 140 by using depth data to approximate a focus position.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors. That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112 and output from the depth sensors processed in a similar manner to that of image sensors 101 and 102 to generate corrected image frames based on an image frame captured by the depth sensor 140. The depth sensor 140 may also be used to apply a correction to a first image frame captured from one of the image sensors 101 and 102, such as by using the depth data to segment an image frame from the sensors 101 or 102 into a foreground and background region and separately processing the foreground and background regions when determining a corrected first image frame. Although the apparatus shown in FIG. 1 may reflect a configuration for some embodiments of the disclosed image signal processing techniques and methods, any number of additional image sensors or image signal processors may be included in other embodiments of the device 100 while still implementing aspects of the disclosed image signal processing techniques and methods.

In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines 136 (IPEs), one or more automatic exposure control (AEC) 134 engines, and/or one or more autofocus (AF) 133 engines. The AF 133, AEC 134, IFE 135, IPE 136 may each include application-specific circuitry, be embodied as software code executed by the ISP 112, and/or a combination of hardware within and software code executing on the ISP 112.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system on chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including the MF-DOF operations as described in embodiments herein. For example, execution of the instructions can instruct the image signal processor 112 to begin or end capturing an image frame or a sequence of image frames, in which the capture includes MF-DOF operations as described in embodiments herein. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106.

In executing the camera application, the processor 104 may be configured to instruct the image signal processor 112 to perform one or more operations with reference to the image sensors 101 or 102. For example, the camera application may receive a command to begin a video preview display upon which a video comprising a sequence of image frames is captured and processed from one or more image sensors 101 or 102. Image correction may be applied to one or more image frames in the sequence. Execution of instructions 108 outside of the camera application by the processor 104 may also cause the device 100 to perform any number of functions or operations. In some embodiments, the processor 104 may include ICs or other hardware (e.g., an artificial intelligence (AI) engine 124) in addition to the ability to execute software to cause the device 100 to perform a number of functions or operations, such as the operations described herein. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

The quality of images captured by an image capture device, such as device 100, can be improved by using large aperture lenses on one or more image sensors of an image capture device. Larger aperture lenses have many benefits, including better low-light performance, which may be beneficial for indoor and night photography, and better Bokeh blur, which may be beneficial for portrait photos. The benefits may be particularly advantageous in mobile devices, which are form-factor limited in available space for camera lens and other equipment. However, large aperture lenses also have a short depth of focus (DOF), resulting in limited portions of a captured image being in focus and the rest of the image having varying degrees of blurriness. When a scene includes many objects at varying distances, an image capture device with a large aperture lens will capture an image with some of those objects out of focus. This may be undesirable, particularly when the out-of-focus objects include other people. Shortcomings mentioned here are only representative and are included to highlight problems that the inventors have identified with respect to existing devices and sought to improve upon. Aspects of devices described below may address some or all of the shortcomings as well as others known in the art. Aspects of the improved devices described below may present other benefits than, and be used in other applications than, those described above.

Figure 2:
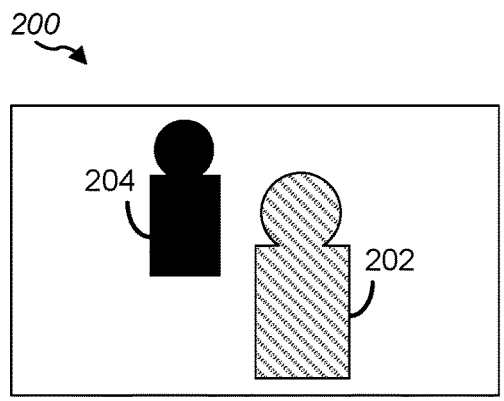
FIG. 2 is an illustration showing a scene with two faces at different focal distances.

An image frame, such as shown in FIG. 2, may be captured by the device 100. FIG. 2 is an illustration showing a scene with two faces at different focal distances from the device 100. An image frame 200 includes a first object 202 and a second object 204. The autofocus (AF) 133 may have focused the camera on the first object 202 in the foreground, while the second object 204 is out of-focus in the background due to the limited depth-of-focus of the lens 131. The depth-of-focus of an image capture may be shallow enough that the first object 202 and the second object 204 cannot both be in focus in a single image frame. As described in embodiments herein, multi-frame depth-of-field (MF-DOF) processing may be executed when two or more regions of interest (ROIs) are determined to exist in an image frame. ROI of interest detection may include detecting objects 202 and 204 in image frame 200. Example embodiments of MF-DOF processing demonstrating different aspects of the MF-DOF processing are described with reference to FIGS. 3-7.

Figure 3:
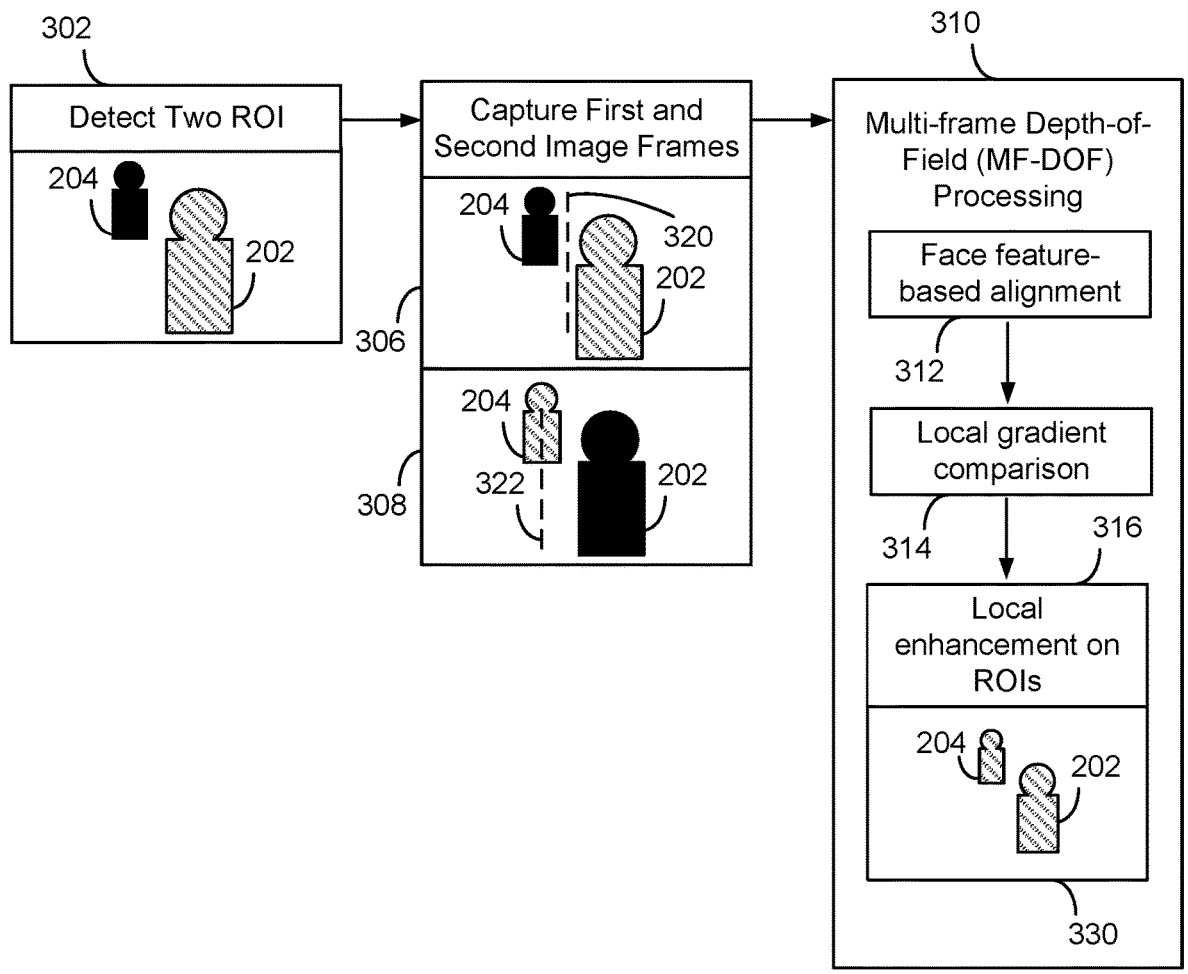
FIG. 3 is a block diagram illustrating a method for processing an image with two or more ROIs according to one or more aspects.

FIG. 3 is a block diagram illustrating a method for processing an image with two or more ROIs according to one or more aspects. At block 302, a first image frame is captured, which may have an object in-focus in the foreground (e.g., near distance) and an object out-of-focus in the background (e.g., far distance). Additional image capture and/or image processing, such as multi-frame depth-of-field (MF-DOF) processing, may be triggered by a determination of at least two regions of interest (ROIs) in the image frame captured at block 302. The identification may be performed through, for example, object or face detection using machine learning algorithms, computer vision (CV)-based segmentation, deep learning, digital signal processing algorithms, depth estimation, or other algorithms. The identification may include analysis to determine that at least one of the regions of interest is blurry or out-of-focus by measuring local contrast within the identified regions of interest. In some embodiments, MF-DOF is triggered when two ROIs are detected by object/face detection to determine a situation when it is desirable to increase the acutance of two faces with depth on the same image frame. In some embodiments, MF-DOF is triggered when two ROIs with at least one blurry ROI is detected. In some embodiments, MF-DOF may be triggered when three (or, more generally, N) objects are detected by object/face detection. The number of objects and types of objects for triggering MF-DOF processing may be customized based on a configuration of an image capture device and/or user preferences. For example, a user may specify rules specifying certain conditions that, when met, may trigger the MF-DOF processing. One example rule may be the detection of two faces in an outdoor scene. Another example rule may be the detection of two faces separated by a distance above a set distance threshold.

When MF-DOF processing is triggered, multiple image frames may be processed to improve the representation of the scene captured by photography using the image capture device. Thus, after determining the trigger condition is met, at block 306 a new first image frame may be obtained, and at block 308 a second image frame may be obtained. In some embodiments, the first image frame of block 306 is obtained with a focal point set at a location 320 between the foreground object and the background object at a focus position that does not result in appreciable blur to the foreground object while increasing detail in the background object. The location 320 may be midway between the foreground and background objects or at another value between the foreground and background objects, such as 20% of the way from the foreground and background objects, although the location 320 may be tunable to trade-off blur on the foreground object with detail on the background object. In some embodiments, the midway point may be midway in depth between objects 202 and 204 and/or midway in lateral dimensions between objects 202 and 204. In some embodiments, the first image frame at block 306 is obtained while focused at the foreground ROI and the second image frame is obtained at block 308 focused at the background ROI. In some embodiments, the capturing of a new image frame at block 306 or block 308 is skipped and the image frame of block 302 is re-used as either the first or second image frame of block 306 or block 308.

The first and second image frames from blocks 306 and 308 are provided to a MF-DOF processing algorithm at block 310, which may perform, at block 312, a feature-based alignment between corresponding ROIs within the first and second image frames. For example, face features of a background face may be determined, and an alignment factor determined that matches the background face features in the first image frame with corresponding features in the second image frame. The alignment factor may be represented as a single vector corresponding to a distance difference between first and second image frames. In some embodiments, the alignment factor may be determined as a function of a location within the image frame of block 308, such that the alignment factor is location-dependent and the alignment difference is represented as a set of motion vectors. In some embodiments, the alignment factor may be determined as an average of the set of motion vectors.

An output image frame with improved properties over either of the first and/or second image frames alone may be produced based on one of the first or second image frames and the alignment factor may be used to determine. For example, MF-DOF processing performed on one of the image frames using the alignment factor and/or other parameters may produce an image frame with more "in-focus" regions than either of the first or second image frame alone by reducing the blur and/or increasing detail in some of the regions of interest. In some embodiments, the MF-DOF processing may include applying artificial intelligence or machine learning algorithms to certain regions of interest to extend the shallow depth-of-field.

In one embodiment, the MF-DOF processing may include processing at blocks 314 and 316 to determine an output image frame 330. At block 314, a local gradient comparison is performed based on the aligned features of the ROIs. In some embodiments, local refers to the region of interest such that a local gradient difference is a gradient difference within the corresponding regions of interest in the first and second image frames. At block 316, a local enhancement operation is performed on the background face based on the local gradient information, such as the intensity value determined at block 314. The enhancement operation may improve image quality, such as by improving clarity or sharpness in a ROI of an image frame that was not in-focus. For example, if the first image frame has a foreground face in focus and a background face out of focus then the enhancement operation may improve clarity or sharpness of the background face using the local gradient information. In some embodiments, the local enhancement may be a brightness preservation contrast enhancement to enhance the details of background face or background ROI. After local enhancement at block 316, the output image frame 330 may appear to have both objects 202 and 204 in-focus.

In some embodiments, the gradient information of block 314 may be normalized prior to comparison, such as to normalize to a scale of 0-1. The comparison of block 314 may determine a local enhancement factor to be used as an input parameter to the processing of block 316. The factor may be determined by comparing the gradients on both faces with a lookup table. In some embodiments, the local enhancement may be controlled based on, for example, a difference of gradient and a human subjective evaluation, with the lookup table constructed for mapping the relations. In some embodiments, the table may include an intensity value for an enhancement operation to be performed at block 316, such as on a scale of 1-4 with 1 indicating a lower strength enhancement operation and 4 indicating a higher strength enhancement operation (e.g., a stronger contrast operation). Multiple such intensity values may be determined for an image by having each intensity value associated with a portion of the image. In some embodiments, each ROI may have an intensity value. In some embodiments, some or all ROIs may be divided into sub-blocks of size N×N (e.g., 2×2, 3×3, 4×4, etc.) with each sub-block having an intensity value.

In some embodiments, a threshold may be used to assign intensity values to regions of an image. For example, the difference of gradient for the first and second image frames having corresponding sub-blocks is compared. If the difference is less than a threshold then the contrast operation may be performed with parameter 1, if the difference is greater than a first threshold and less than a second threshold, then the contrast operation may be performed with the parameter 2, if the difference is greater than the second threshold and less than a third threshold, then the contrast operation may be performed with the parameter 3. If the difference is greater than the third threshold then the contrast operation may be performed with parameter 4.

The image processing technique described in FIG. 3 improves the appearance of a first image frame based on characteristics of a second image frame without combining data of the second image frame with the first image frame. This processing removes the possibility of adding artifacts to the first image frame resulting from the merging of data from multiple image frames. For example, discontinuities and shifts in objects between the image frames may result in ghosting or broken lines when a first image frame is merged with a second image frame. Additionally, artifacts such as luminance changes and different noise levels may be avoided that may be introduced during a fusion operation. An operation on the first image frame may be performed based on analysis of the second image frame, including analysis comparing corresponding regions of interest between the first and second image frames. Aspects of an image processing techniques for correcting a first image frame without merging with data from a second image frame are described with reference to FIG. 4 and FIG. 5.

Figure 4:
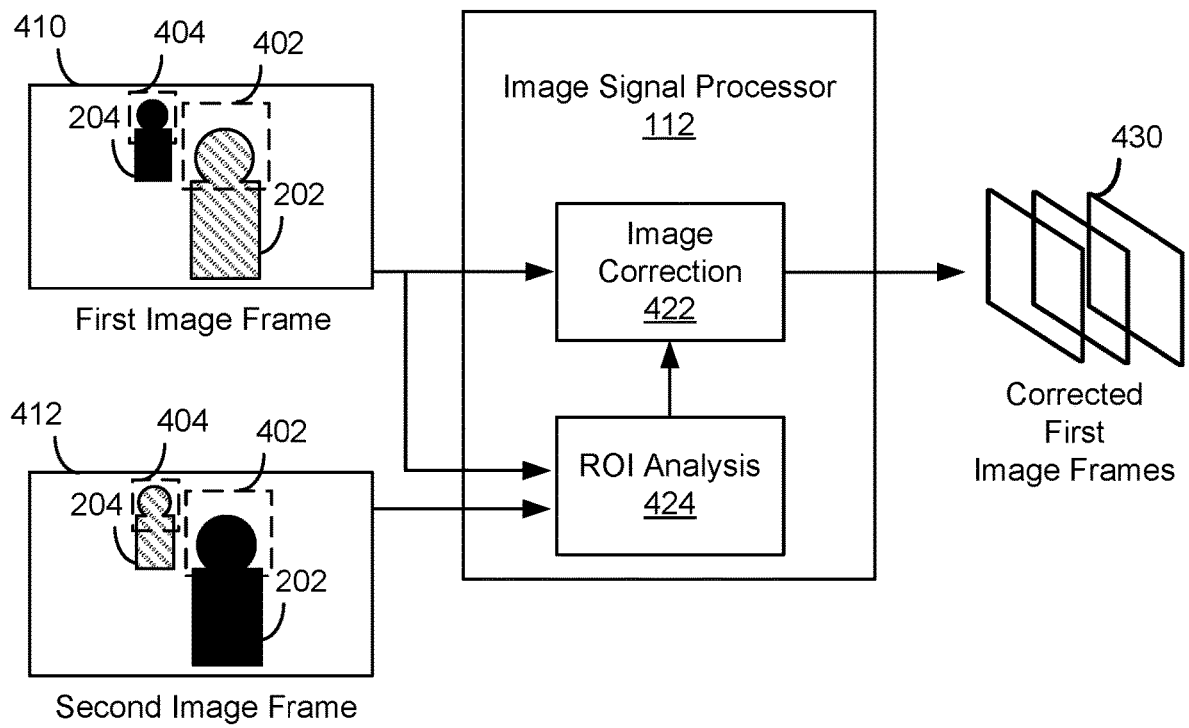
FIG. 4 is a block diagram illustrating processing of multiple image frames to increase depth of focus in an image frame according to one or more aspects.

FIG. 4 is a block diagram illustrating processing of multiple image frames to increase depth of focus in an image frame according to one or more aspects. An image signal processor 112 may receive a first image frame 410 and a second image frame 412. The two image frames 410, 412 may have a foreground object 202 and a background object 204. The ISP 112 may recognize regions of interest 402 and 404 corresponding to faces on the objects 202 and 204. The first and second image frames 410, 412 may be input to an ROI analysis module 424, which determines one or more parameters (such as by using a local gradient comparison) based on the first and second image frames 410, 412. The one or more parameters may be input to an image correction module 422, which receives the first image frame 410 and performs operations on the first image frame 410 based on the one or more parameters. The image correction module 422 thus only operates on data from the first image frame 410 to determine corrected first image frames 430, which may reduce artifacts in the corrected first image frames 430. Although individual image frames are shown input to the ISP 112, the ISP 112 may process a series of image frames corresponding to a video sequence and output a corrected series of image frames as a corrected video sequence, in which each image frame is processed in a similar manner to improve characteristics of certain regions of interest (ROIs) within the image frames.

Figure 5:
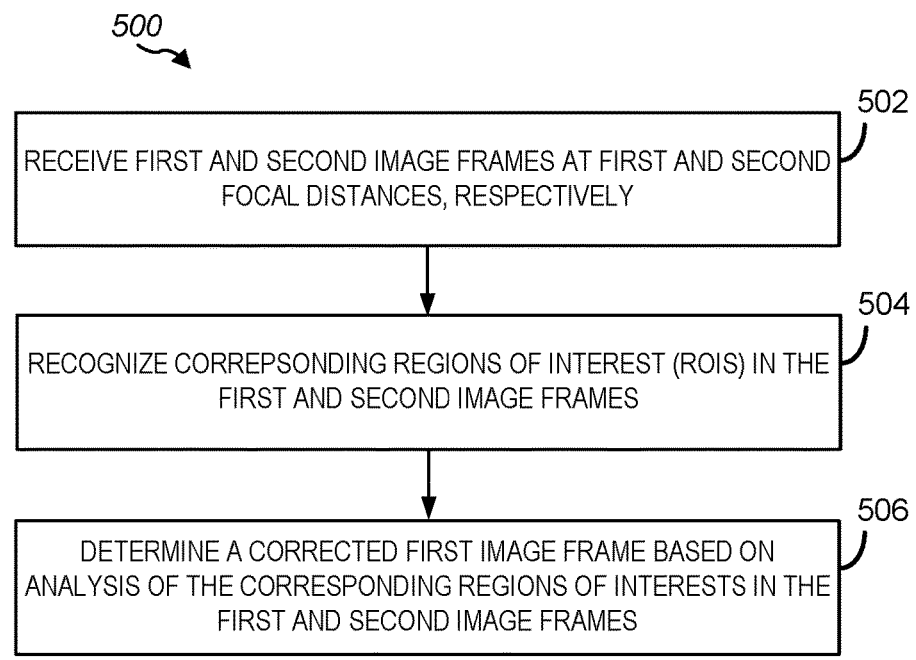
FIG. 5 is a flow chart illustrating a method for processing an image with two or more ROIs according to one or more aspects.

One example method for image signal processing by the image signal processor 112 is described with reference to FIG. 5. FIG. 5 is a flow chart illustrating a method for processing an image with two or more ROIs according to one or more aspects. Method 500 may be executed by another processor, such as processor 104, or other logic circuitry in the image capture device, or a combination of circuitry within the image capture device. The method 500 includes, at block 502, receiving first and second image frames at first and second focal distances, respectively. For example, the ISP 112 may control a camera through an autofocus (AF) module 133 to capture the first and second image frames. At block 504, the ISP 112 may recognize regions of interest in the first and second image frames and match regions of interest between the first and second image frames. At block 506, the ISP 112 may determine a corrected first image frame based on the first image frame and analysis of the corresponding regions of interest in the first and second image frames.

In some embodiments, the determination of block 506 performed in image correction module 422 may include a contrast operation performed based on analysis performed by ROI analysis module 424 to determine a local gradient difference between corresponding regions of interest. An example method for such an embodiment is described with reference to FIG. 6.

Figure 6:
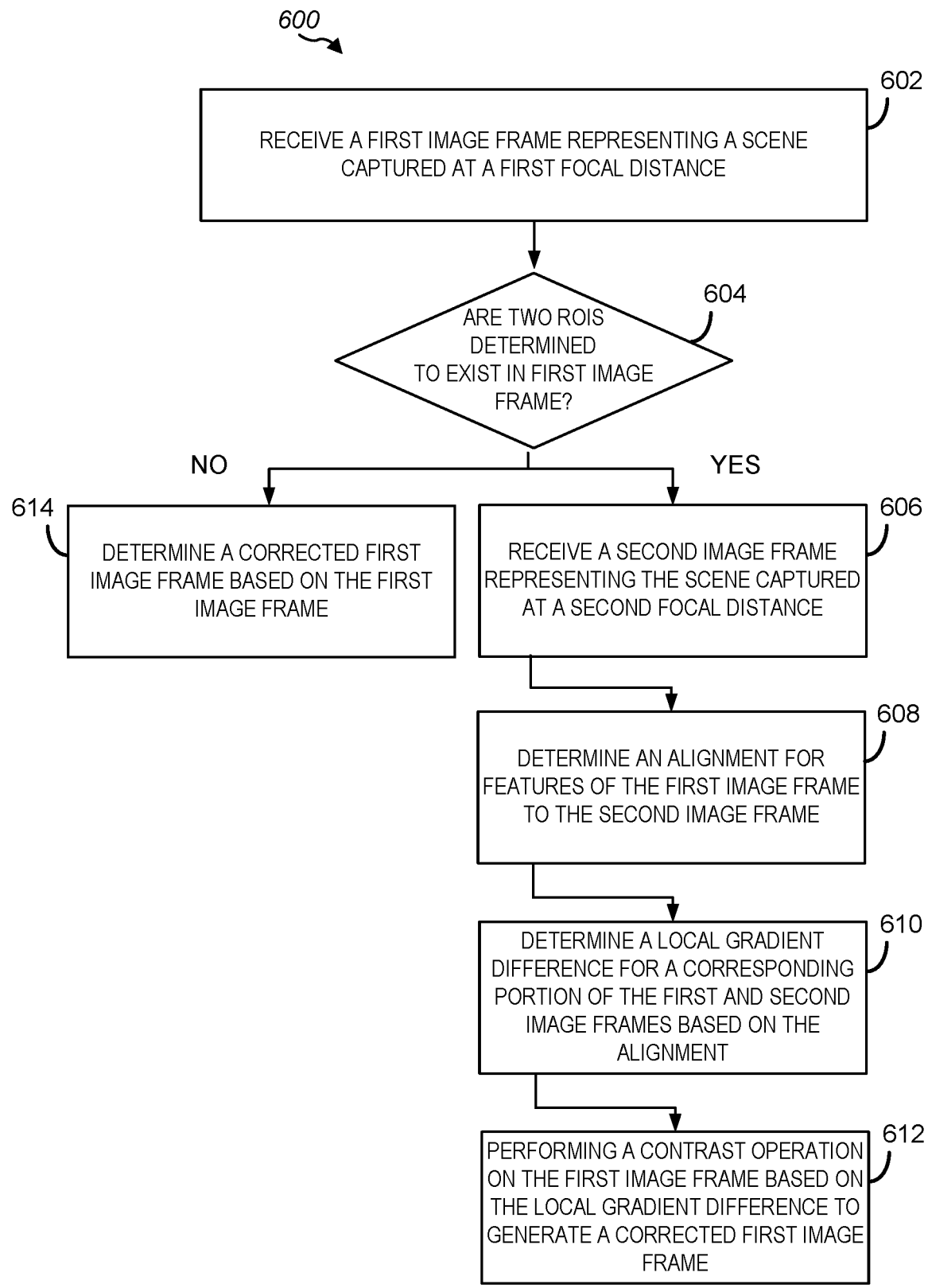
FIG. 6 is a flow chart illustrating a method for processing an image with two or more ROIs using a contrast operation according to one or more aspects.

FIG. 6 is a flow chart illustrating a method for processing an image with two or more ROIs according to one or more aspects. A method 600 begins at block 602 with receiving a first image frame representing a scene captured at a first focal distance. At block 604, it is determined whether there are two ROIs in the first image frame, such as by determining if there are two regions of interests (ROIs) (e.g., faces) present in the first image frame. If there are not two or more ROIs at block 604, then the method 600 continues to block 614 to output a corrected first image frame based on the first image frame. The original captured first image, with its blurred background, is processed (e.g., cropped, tone mapped, etc.) by the image signal processor to determine a corrected first image frame that is output and shown on a preview or saved as a photography. In some embodiments, the original first image frame is output without any modification at block 614.

If two or more ROIs are identified at block 604, then the method 600 continues to block 606 to receive a second image frame representing the same scene as the first image frame but captured at a second focal distance different from the first focal distance of the first image frame. The second image frame may be captured, for example, by seeding the auto focus (AF) algorithm with location on which to focus and/or seeding the AF algorithm with a depth value corresponding to the ROI obtained when capturing the first image frame. In some embodiments, block 606 may include receiving a third image frame to use in place of the first image frame received at block 602.

At block 608, an alignment correction is determined for matching features of the first image frame to the second image frame. At block 610, a local gradient difference is determined for corresponding portions of the first and second image frame based on the determined alignment correction. At block 612, an enhancement operation is performed on the first image frame based on the local gradient difference of block 610 to generate a corrected first image frame.

Figure 7:
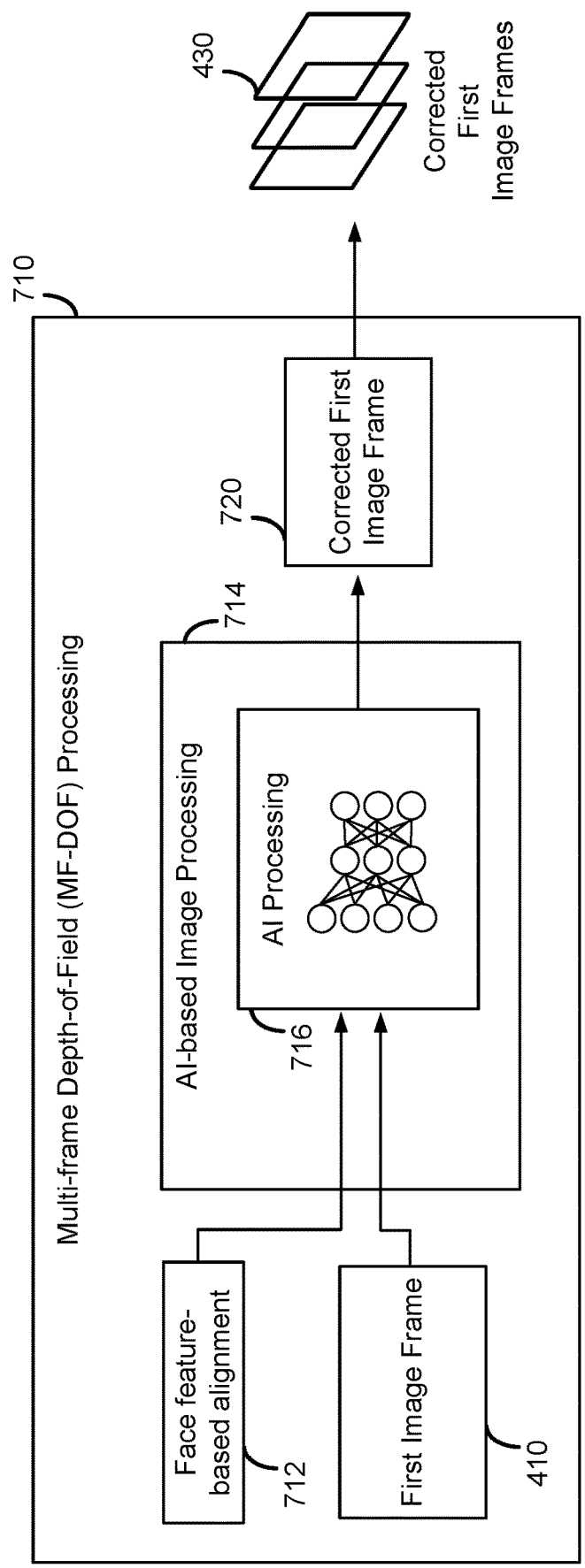
FIG. 7 is a block diagram illustrating a method for processing an image with two or more ROIs with AI-based deblurring according to one or more aspects.

In some embodiments, the enhancement operation of block 612 may be based on an artificial intelligence (AI) algorithm, such as a machine learning (ML) algorithm. FIG. 7 is a block diagram illustrating a method for processing an image with two or more ROIs with AI-based deblurring according to one or more aspects. A multi-frame depth-of-field (MF-DOF) operation 710 may perform AI-based image processing 714 using face feature-based alignment at block 712, similar to block 312 of FIG. 3. The alignment correction determined at block 712 may be used by an AI-based deblurring algorithm 716 to apply an enhancement operation to the first image frame 410, such as to a region of interest in the first image frame, to generate a corrected first image frame 720. The corrected first image frame 720 as part of a series of corrected first image frames 430 to a preview display in a camera application of the image capture device and/or captured as a photograph for storage or transmission by the image capture device.

The AI-based deblurring algorithm may be trained based on a ground truth (e.g., the focused background portrait/face/ROI) and the blurred image (e.g., the first image frame with shallow depth-of-focus having the background portion/face/ROI blurred). In some embodiments, the AI-based deblurring may be executed on a GPU, DSP, ASIC, or other logic circuitry, rather than a CPU, which releases the CPU computational resources for other tasks. In some embodiments, the AI-based deblurring may have less latency and reduced artifacts compared to the local gradient comparison and enhancement methods of FIG. 3. The training of the parameters of the AI-based algorithm may be based on an Adam optimizer in which the loss function is MSE:

$$E_k = \frac{1}{2N} \sum_{n=1}^{N} |a_{k,n} - \tilde{a}_{k,n}|^2$$

wherein K is the Epoch, N is the Patch number, a is the Groundtruth PSF, and $\tilde{a}_{k,n}$ a—is the estimated PSF at n-th image in the patch and k-th epoch. The training may be performed offline using a subject score assigned by a human to pairs of blurry and not blurry ROIs, and the training model configured as a static model on the image capture device.

In some embodiments, the AI-based deblurring algorithm may use a model trained by a ResNet algorithm, such as the ResNet-34 algorithm, using a dataset collection of corresponding clear and blurry face ROIs from image frames and training the model by adopting the ResNet-34 to consider the degradation problem linking the blurry and clear background face ROIs. Although ResNet-34 is provided as one example of a machine learning algorithm, other algorithms may be trained and used in the alternative or in combination with ResNet-34.

Machine learning models, as described herein, may include logistic regression techniques, linear discriminant analysis, linear regression analysis, artificial neural networks, machine learning classifier algorithms, or classification/regression trees in some embodiments. In some aspects, the machine learning may include one or more artificial neural networks, which may include an interconnected group of artificial neurons (e.g., neuron models) for modeling relationships between parameters, such as between two image frames corresponding to in-focus and blurred representation of a face or other object. In some aspects, the machine learning may include one or more convolutional neural networks, which are a type of feed-forward artificial neural network. Convolutional neural networks may include collections of neurons that each have a receptive field and that collectively tile an input space. In some aspects, the machine learning may include one or more deep learning architectures, such as deep belief networks and deep convolutional networks, which are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features. In various aspects, machine learning systems may employ Naive Bayes predictive modeling analysis of several varieties, learning vector quantization, or implementation of boosting algorithms such as Adaboost or stochastic gradient boosting systems for iteratively updating weighting to train a machine learning classifier to determine a relationship between an influencing attribute, such as local gradient level, and an in-focus or blurred aspect of an object or face within an image frame and/or a degree to which such an influencing attribute affects the outcome of such a system or final output pixel for correcting an image frame.

Processing of an image frame to deblur a background ROI, such as a background face, may overcome the drawbacks of utilizing a larger lens and larger aperture (which increases the blur of the background), increases light intake in low-light condition, and has more natural bokeh performance than other computational techniques. Specifically in the dual face in-focus embodiments, the acutance may be improved on the back face, the front face may also be made clearer, and/or the hair of the back face may be enhanced to improve the natural appearance of the face in the background.

In some embodiments, the corrected first image frame is determined without merging the data in the first image frame with the data in the second image frame. This removes the possibility of artifacts in the corrected first image frame resulting from merging two representations from two different image frames.

It is noted that one or more blocks (or operations) described with reference to FIGS. 3-5 may be combined with one or more blocks (or operations) described with reference to another of the figures.

In one or more aspects, techniques for supporting image signal processing may include additional aspects, such as any single aspect or any combination of aspects described below or in connection with one or more other processes or devices described elsewhere herein. In a first aspect, supporting image signal processing may include an apparatus configured to perform steps comprising receiving a first image frame representing a scene captured at a first focal distance; receiving a second image frame representing the scene captured at a second focal distance different from the first focal distance; determining a local gradient difference between a first portion of the first image frame and a second portion of the second image frame, the first and second portions corresponding to a region of interest (ROI) in the scene; and/or performing a contrast enhancement operation on the first portion of the first image frame based on the local gradient difference to determine a corrected first image frame. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In one or more aspects, techniques for supporting image capture and/or image processing may include additional aspects, such as any single aspect or any combination of aspects described below or in connection with one or more other processes or devices described elsewhere herein. In a first aspect, supporting image capture and/or image processing may include an apparatus configured to perform steps of receiving a first image frame representing a scene captured at a first focal distance; receiving a second image frame representing the scene captured at a second focal distance different from the first focal distance; determining a corresponding set of regions of interest comprising a first region of interest in the first image frame and a second region of interest in the second image frame; determining a value based on a comparison of the first region of interest with the second region of interest; determining a corrected first image frame based on the first image frame and the value. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the apparatus is further configured to perform operations including determining a first face in the first region and in the second region; and determining a second face in a third region of interest, wherein determining the corrected first image frame comprises increasing detail of the first face such that the first face and the second face appear in-focus in the corrected first image frame.

In a third aspect, in combination with one or more of the first aspect or the second aspect, determining a value comprises determining a local gradient difference between the first region of interest and the second region of interest; and determining a corrected first image frame comprises performing a contrast operation on the first region of interest of the first image frame based on the local gradient difference.

In a fourth aspect, in combination with one or more of the first aspect through the third aspect, performing the contrast operation preserves a brightness of the first image frame.

In a fifth aspect, in combination with one or more of the first aspect through the fourth aspect, determining a corrected first image frame comprises performing an artificial intelligence-based operation.

In a sixth aspect, in combination with one or more of the first aspect through the fifth aspect, the apparatus is further configured to perform operations including determining an alignment difference between the first image region of interest and the second region of interest, wherein determining a value is based on the alignment difference.

In a seventh aspect, in combination with one or more of the first aspect through the sixth aspect, determining the alignment difference comprises determining a motion of an object recognized in the first image frame from a first location in the first image frame to a second location in the second image frame.

In an eighth aspect, in combination with one or more of the first aspect through the seventh aspect, the apparatus is further configured to perform operations including determining a number of regions of interest in the first image frame, wherein performing the operations of receiving the second image frame, determining the value, and determining the corrected first image frame is based on the number of regions being greater than one.

In a ninth aspect, in combination with one or more of the first aspect through the eighth aspect, determining a number of regions of interest in the first image frame comprises detecting faces in the first image frame.

In a tenth aspect, in combination with one or more of the first aspect through the ninth aspect, the first focal distance is associated with a first face in the first region of interest and the second region of interest; and the second focal distance is associated with a different, second face in a third region of interest.

In an eleventh aspect, in combination with one or more of the first aspect through the tenth aspect, the first focal distance is a location between the first face in the first region of interest and the second face in the third region of interest, and wherein the second focal distance is a focal distance of the second face.

In a twelfth aspect, in combination with one or more of the first aspect through the eleventh aspect, determining a corrected first image frame is not based on combining any portion of the second image frame with the first image frame.

In a thirteenth aspect, in combination with one or more of the first aspect through the twelfth aspect, the apparatus further includes a camera comprising an image sensor and a lens.

In a fourteenth aspect, in combination with one or more of the first aspect through the thirteenth aspect, the at least one processor is coupled to the camera and is configured to perform operations including: controlling the camera to capture the first image frame at the first focal distance; determining a presence of a first face and a second face in the first image frame; and controlling the camera to capture the second image frame at the second focal distance based on determining the presence of the first face and the second face in the first image frame.

In a fifteenth aspect, in combination with one or more of the first aspect through the fourteenth aspect, the at least one processor comprises an image signal processor (ISP).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-7 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are some-times used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
   receiving a first image frame representing a scene captured at a first focal distance;
   receiving a second image frame representing the scene captured at a second focal distance different from the first focal distance;
   determining a corresponding set of regions of interest comprising a first region of interest in the first image frame and a second region of interest in the second image frame;
   determining a value based on a comparison of the first region of interest with the second region of interest;
   determining a corrected first image frame based on the first image frame and the value;
   determining a first object in the first region of interest and in the second region of interest; and
   determining a second object in a third region of interest,
   wherein determining the corrected first image frame comprises increasing detail of the first object such that the first object and the second object appear in-focus in the corrected first image frame.

2. The method of claim 1, wherein the first object is a first face and the second object is a second face.

3. The method of claim 2, wherein:
   the first focal distance is associated with the first face in the first region of interest and the second region of interest; and
   the second focal distance is associated with a different, the second face in the third region of interest.

4. The method of claim 3, wherein the first focal distance is a location between the first face in the first region of interest and the second face in the third region of interest, and wherein the second focal distance is a focal distance of the second face.

5. The method of claim 1, wherein:
   determining the value comprises determining a local gradient difference between the first region of interest and the second region of interest; and
   increasing detail of the first object comprises performing a contrast operation on the first region of interest of the first image frame based on the local gradient difference.

6. The method of claim 5, wherein performing the contrast operation preserves a brightness of the first image frame.

7. The method of claim 1, wherein determining the corrected first image frame comprises performing an artificial intelligence-based operation.

8. The method of claim 1, further comprising:
   determining an alignment difference between the first region of interest and the second region of interest,
   wherein determining the value is based on the alignment difference.

9. The method of claim 8, wherein determining the alignment difference comprises determining a motion of an object recognized in the first image frame from a first location in the first image frame to a second location in the second image frame.

10. The method of claim 1, further comprising:
    determining a number of regions of interest in the first image frame,
    wherein performing the operations of receiving the second image frame, determining the value, and determining the corrected first image frame is based on the number of regions of interest being greater than one.

11. The method of claim 10, wherein determining the number of regions of interest in the first image frame comprises detecting faces in the first image frame.

12. The method of claim 1, wherein determining the corrected first image frame is not based on combining any portion of the second image frame with the first image frame.

13. An apparatus, comprising:
a memory storing processor-readable code; and
at least one processor coupled to the memory, the at least one processor configured to execute the processor-readable code to cause the at least one processor to perform operations including:
receiving a first image frame representing a scene captured at a first focal distance;
receiving a second image frame representing the scene captured at a second focal distance different from the first focal distance;
determining a corresponding set of regions of interest comprising a first region of interest in the first image frame and a second region of interest in the second image frame;
determining a value based on a comparison of the first region of interest with the second region of interest;
determining a corrected first image frame based on the first image frame and the value;
determining a first object in the first region of interest and in the second region of interest; and
determining a second object in a third region of interest,
wherein determining the corrected first image frame comprises increasing detail of the first object such that the first object and the second object appear in-focus in the corrected first image frame.

14. The apparatus of claim 13, wherein the first object is a first face; and the second object is a second face.

15. The apparatus of claim 14, wherein:
the first focal distance is associated with the first face in the first region of interest and the second region of interest; and
the second focal distance is associated with the second face in the third region of interest.

16. The apparatus of claim 15, wherein the first focal distance is a location between the first face in the first region of interest and the second face in the third region of interest, and wherein the second focal distance is a focal distance of the second face.

17. The apparatus of claim 14, further comprising:
a camera comprising an image sensor and a lens,
wherein the at least one processor is coupled to the camera and is configured to perform operations including:
controlling the camera to capture the first image frame at the first focal distance;
determining a presence of the first face and the second face in the first image frame; and
controlling the camera to capture the second image frame at the second focal distance based on determining the presence of the first face and the second face in the first image frame.

18. The apparatus of claim 13, wherein:
determining the value comprises determining a local gradient difference between the first region of interest and the second region of interest; and
increasing detail of the first object comprises performing a contrast operation on the first region of interest of the first image frame based on the local gradient difference.

19. The apparatus of claim 18, wherein performing the contrast operation preserves a brightness of the first image frame.

20. The apparatus of claim 13, wherein determining the corrected first image frame comprises performing an artificial intelligence-based operation.

21. The apparatus of claim 13, wherein the at least one processor is configured to execute the processor-readable code to cause the at least one processor to perform further operations including:
determining an alignment difference between the first region of interest and the second region of interest,
wherein determining a value is based on the alignment difference.

22. The apparatus of claim 21, wherein determining the alignment difference comprises determining a motion of an object recognized in the first image frame from a first location in the first image frame to a second location in the second image frame.

23. The apparatus of claim 13, wherein the at least one processor is configured to execute the processor-readable code to cause the at least one processor to perform further operations including:
determining a number of regions of interest in the first image frame,
wherein performing the operations of receiving the second image frame, determining the value, and determining the corrected first image frame is based on the number of regions of interest being greater than one.

24. The apparatus of claim 23, wherein determining the number of regions of interest in the first image frame comprises detecting faces in the first image frame.

25. The apparatus of claim 13, wherein determining the corrected first image frame is not based on combining any portion of the second image frame with the first image frame.

26. The apparatus of claim 13, wherein the at least one processor comprises an image signal processor (ISP).

27. A non-transitory computer-readable medium storing instructions that, when executed by a processor, cause the processor to perform operations comprising:
receiving a first image frame representing a scene captured at a first focal distance;
receiving a second image frame representing the scene captured at a second focal distance different from the first focal distance;
determining a corresponding set of regions of interest comprising a first region of interest in the first image frame and a second region of interest in the second image frame;
determining a value based on a comparison of the first region of interest with the second region of interest;
determining a corrected first image frame based on the first image frame and the value;
determining a first object in the first region of interest and in the second region of interest; and
determining a second object in a third region of interest,
wherein determining the corrected first image frame comprises increasing detail of the first object such that the first object and the second object appear in-focus in the corrected first image frame.

28. The non-transitory, computer-readable medium of claim 27, wherein the first object is a first face and the second object is a second face.

29. The non-transitory, computer-readable medium of claim 27, wherein:

determining the value comprises determining a local gradient difference between the first region of interest and the second region of interest; and increasing detail of the first object comprises performing a contrast operation on the first region of interest of the first image frame based on the local gradient difference.

30. The non-transitory, computer-readable medium of claim 27, wherein the instructions, when executed by the processor, cause the processor to perform further operations including:

determining a number of regions of interest in the first image frame, wherein performing the operations of receiving the second image frame, determining the value, and determining the corrected first image frame is based on the number of regions of interest being greater than one.

31. An apparatus, comprising:

a camera comprising an image sensor and a lens;

a memory storing processor-readable code; and at least one processor coupled to the memory and to the camera, the at least one processor configured to execute the processor-readable code to cause the at least one processor to perform operations including:

controlling the camera to obtain a first image frame representing a scene captured at a first focal distance;

determining the first image frame includes a first face associated with the first focal distance and a second face associated with a second focal distance;

controlling the camera to obtain a second image frame representing the scene captured at a third focal distance between the first focal distance and the second focal distance;

controlling the camera to obtain a third image frame representing the scene captured at the second focal distance;

determining a corresponding set of regions of interest comprising a first region of interest in the second image frame associated with the first face and a second region of interest in the third image frame associated with the first face;

determining a value based on a comparison of the first region of interest with the second region of interest; and determining a corrected image frame based on the second image frame and the value.

32. The apparatus of claim 31, wherein determining the corrected image frame comprises performing a contrast enhancement operation on the first region of interest of the second image frame.

33. The apparatus of claim 32, wherein performing the contrast enhancement operation on the first region of interest of the second image frame is based on an intensity corresponding to the value.

34. The apparatus of claim 31, wherein determining the corrected image frame comprises performing an artificial intelligence-based operation on the first region of interest of the second image frame.

* * * * *